July 5, 1955     B. G. STÅLHEIM     2,712,307

STONE SAWING MACHINE

Filed July 9, 1953     5 Sheets—Sheet 3

INVENTOR.
BROR GUSTAF STÅLHEIM

United States Patent Office 2,712,307
Patented July 5, 1955

2,712,307

STONE SAWING MACHINES

Bror Gustaf Stålheim, Stockholm, Sweden

Application July 9, 1953, Serial No. 366,975

19 Claims. (Cl. 125—16)

This invention relates to the sawing of stone such as marble, limestone, granite and the like and more particularly to a stone sawing machine of the type comprising a supporting structure with a reciprocatably moving saw sash, in which are stretched a plurality of parallel saw blades serving to cut a stone block into several parallel slabs in one and the same operation when the machine is working.

To facilitate the understanding of the present invention, it should be kept in mind that, in contradistinction to sawing machines for other materials, a stone sawing machine works with very large and heavy work pieces of substantially parallelepipedic shape and of a very hard and brittle material, which becomes so expensive on account of the high quarrying and transport costs that it is desirable to make the saw cuts as narrow as possible in order to allow a maximum ultilization of the material. Great importance is attached to the evenness of the cut slabs because, in contradistinction to wood or metal, the stone material can be planed only by removal of material, which is a very troublesome procedure. Besides, the stone must always, due to its nature, be machined with saw blades, which are liable to break and are rather weak, except for the cutting teeth or segments, compared with the stone material. Saw blades for the machining of stone are very expensive if they are provided with teeth, segments or the like of hard material such as hard metal (e. g. sintered carbides), diamonds or the like, which has proven necessary to obtain great sawing capacity and speeds, and the blades should therefore be handled with reasonable care.

The main and general object of the present invention is to provide a stone sawing machine which meets high demands on capacity, efficiency and reliability of service but which entails small equipment and erection costs and requires little space.

These and other objects of the invention will appear from the following description of a preferred embodiment of the stone sawing machine according to the invention, which is illustrated in the accompanying drawings but is of course not meant to limit the scope of the inventive idea.

In the drawings:

Figs. 7, 8 and 9 show details of the feeding mechanism, Fig. 10 diagrammatically shows control means for operating the different parts of the sawing machine, and Figs. 11, 12, 13 and 14 diagrammatically show the various phases of motion of the saw sash during sawing.

In general, the illustrated stone sawing machine (Figs. 1, 2 and 3) comprises a frame-like supporting structure having two side supports 1 provided on either side of a path, along which the stone block is fed during sawing, and a cross beam 2 extending between the upper ends of said supports. Swingably suspended from the cross beam 2 is a substantially vertical guiding frame 3, the lower end of which projects into a well 4 in the machine foundation. In this well 4 there is provided a hydraulic jack 5, the piston of which is hinged to the lower cross member of the frame 3, while its cylinder is hinged to a bracket 6 in the well 4 so that by operation of the jack 5 the frame 3 can be alternatively pressed against shoulders 7 (Fig. 1) in the well 4 and swung clockwise (in Fig. 1) away from the shoulders 7 about the axle 8, which is carried by crossbeam 2 and disposed substantially horizontal and at right angles to the feed path of the stone block.

The vertical side members of the frame 3 are provided with guide means in the form of steel rods 9 (see particularly Fig. 4) which serve as guides for a rectangular frame-like slide 10, which is vertically slidable in the frame 3. The slide 10 is actuated by a double-acting hydraulic jack 11 (or, as indicated by dash lines in Fig. 3, by two parallel, cooperating hydraulic jacks 11'), the piston of which is connected to the upper end of the slide 10, while its cylinder is hinged to the top portion of the frame 3. Thus the slide 10 can be caused to move upwards and downwards in the frame 3 by means of the jack 11.

Figure 4:
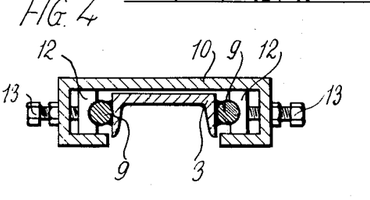
Fig. 4 is a cross section through one sash side, taken along line IV—IV in Fig. 1.

The vertical side members of the slide 10 are formed as U-beams, opening outwardly, which enclose the vertical portions of the guide frame 3 and the guide rods 9 provided thereon, and, as is particularly apparent from Fig. 4, the slide is provided, within the outwardly protruding flanges of the side members, with sliding shoes 12, which may be pressed against the guide rods 9 by means of lockable setting screws 13.

As already mentioned, the slide 10 has the shape of a rectangular frame, in which a changeable saw sash 14 is clamped by means of clamp screws 15 (Fig. 1) at the lower part of the slide 10, said clamp screws pressing the saw sash upwards towards the upper member of the slide 10, as well as by retaining means 16 at the upper member of the slide 10, which hold the saw sash 14 pressed against shoulders 17 at the slide 10. In the changeable saw sash 14 are stretched in a known manner a plurality of parallel saw blades 18 extending between the upper and lower sides of the saw sash 14. The ends of the saw blades are provided with yokes 19 inserted between double cross pieces 14' at the upper and lower ends respectively of the saw sash 14 and secured with wedges 20, which are inserted through the yokes 19 outside the cross pieces 14', whereby the saw blades are stretched and maintained in stretched position.

Figure 1:
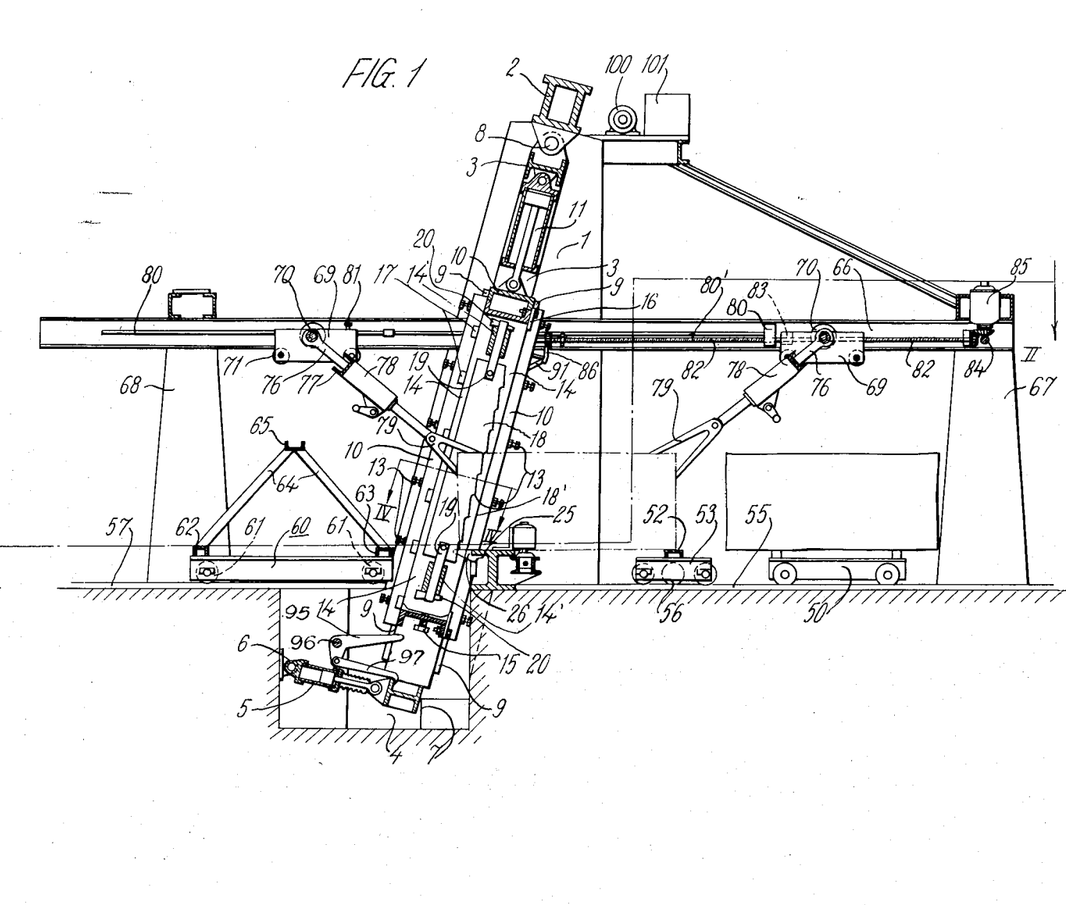
Fig. 1 is a longitudinal section through the stone sawing machine.
Figure 2:
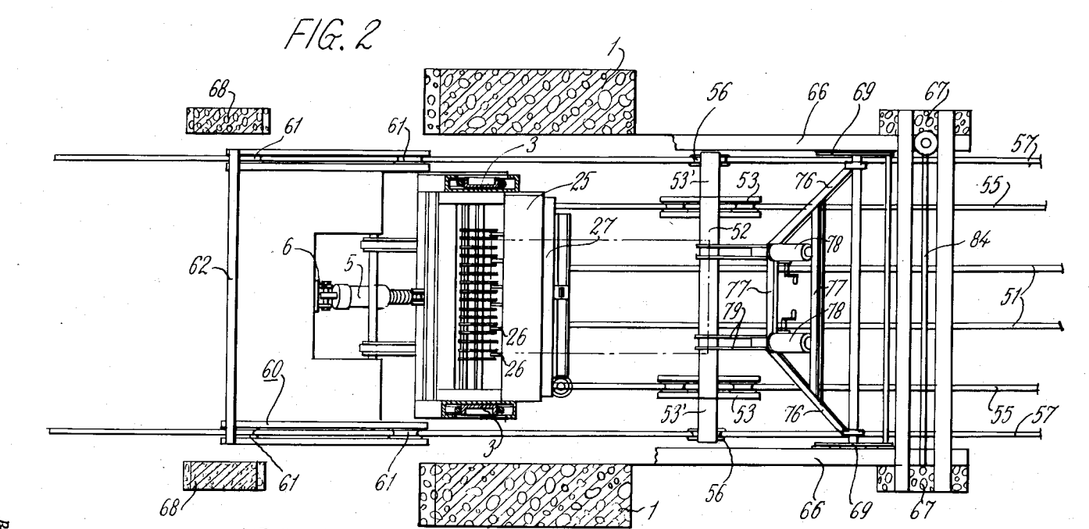
Fig. 2 is a sectional plan view of the same machine as viewed along the line II—II in Fig. 1.
Figure 5:
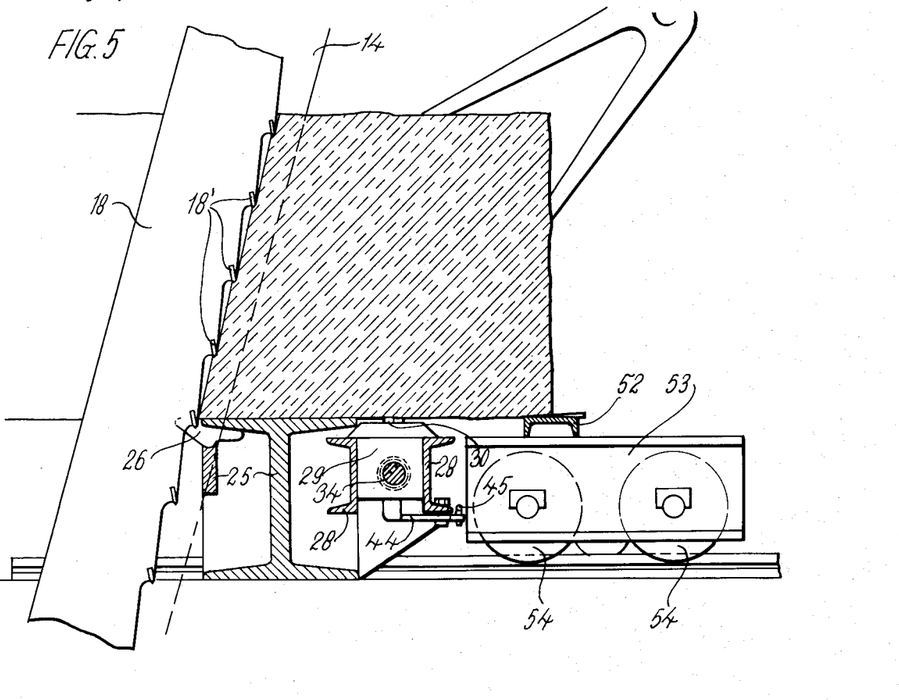
Fig. 5 shows, on an enlarged scale, a partial longitudinal section through the saw sash, the anvil and a stone block during sawing.

As will be especially apparent from Fig. 1, the frame 3 is not exactly vertical but slightly inclined and the saw blades 18, which are provided with teeth 18' of hard metal (sintered carbide) are as shown in Fig. 5 so placed that the teeth are located on the side towards which the frame is inclined (to the right in Fig. 1). The teeth 18' of the saw blades 18 are raked downwardly and the cutting edges of the saw blades 18, i. e. a line touching the points of all the teeth on each saw blade, is so arranged relative the path of movement of the slide 10 in the frame 3 that each tooth 18' projects slightly more to the right (in Fig. 5) than the adjacent lower tooth. This arrangement provides for what might be called a stair-step-like cutting of the stone blocks, each tooth 18' being caused to partake in the cutting despite the fact that the path of movement of the saw sash is linear.

Figure 3:
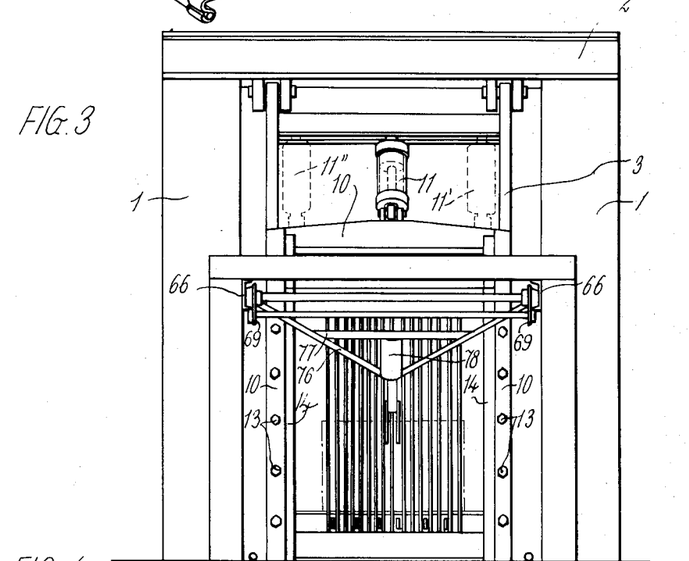
Fig. 3 is an end view of the saw as viewed from the discharge end thereof.

As already mentioned, a reciprocating, substantially vertical motion along the frame 3 is imparted to the slide 10 and thus to the saw sash 14 by means of the double-acting hydraulic jack 11 (or the cooperating jacks 11'). This hydraulic operation (performed by means of a substantially incompressible liquid such as oil) of the saw sash offers very great advantages. Thus the equipment and erection costs are considerably lower than for mechanically driven stone saws, in which the saw sash is driven by a heavy balance wheel and cranks with connecting rods or the like, much space is saved and the structure gains in simplicity. Besides, the hydraulic operation of the saw sash offers complete control of the saw sash movements and prevailing loads, and permits immediate stopping of the machine movements if necessary, and this even automatically, the inertia of the moving parts of the machine being rather small, since the large balance wheels normally used are wholly dispensed with. Furthermore, the machine will run very smoothly and evenly in operation and there is practically no risk of vibrations, which might damage the structure on the whole and particularly the saw blades with their delicate teeth and the relatively brittle work pieces.

Still further, the saw illustrated in the drawings works in a way which is unusual in the art of stone sawing, i. e. the saw sash is reciprocated substantially vertically, while the stone blocks are advanced horizontally through the saw sash during the sawing operation in a way to be described more closely in the following text. This feature also brings about several essential advantages, above all that the cutting is carried out across the shorter dimensions of the substantially parallelepipedic stone block, which is generally to be cut in its longitudinal direction. In consequence thereof, the saw blades 18 may be considerably shorter than those needed in a sawing machine having a horizontal and substantially horizontally reciprocated saw sash, which moves downwardly through and past the stone block. The shorter saw blades allowed by the invention involve a reduction of the strains thereon, whereby thinner saw blades may be used and narrower cuts are obtained. These shorter saw blades are also less exposed to bending and breaking stresses, and consequently the cut slabs will gain in flatness of the surfaces and exactness of measure. Another appreciable advantage is that a sawing machine with vertically moving saw sash is able to work nearly continuously, i. e. the time the machine must be idle to allow insertion of a new stone block and removal of the cut slabs is reduced to a minimum.

However, the use of a substantially vertically working saw sash in a stone sawing machine involves special stone feeding problems. Specifically it must be possible to cut all through the stone blocks, and furthermore a satisfactory result cannot be obtained unless the stone blocks are prevented from tilting or performing any other uncontrolled movements while being fed through the saw sash. In fact, tilting or other uncontrolled movements would, due to the large dimensions and weight of the stone blocks, inevitably cause damaging of the machine, particularly of the saw blades and their teeth or segments. For this reason, the stone sawing machine illustrated in the drawing is provided with a rigid anvil 25 placed in front of the feed side of the saw sash, and the stone block slides over this anvil when being fed through the saw sash. The anvil 25 has a completely flat horizontal top, and on the side facing the saw blades it is provided with transversally displaceable extensions 26 (see Fig. 5), which project in between some of the saw blades in the saw sash to also support the stone block at this place. In order that the stone block shall slide easily on the anvil 25, the stone block is planed on the lower side, simultaneously with being fed through the saw sash, by means of a planing device, which is generally designated by the numeral 27 (see Figs. 1 and 2) and is provided at that side of the anvil 25 that is turned away from the saw blades 18.

Figure 6:
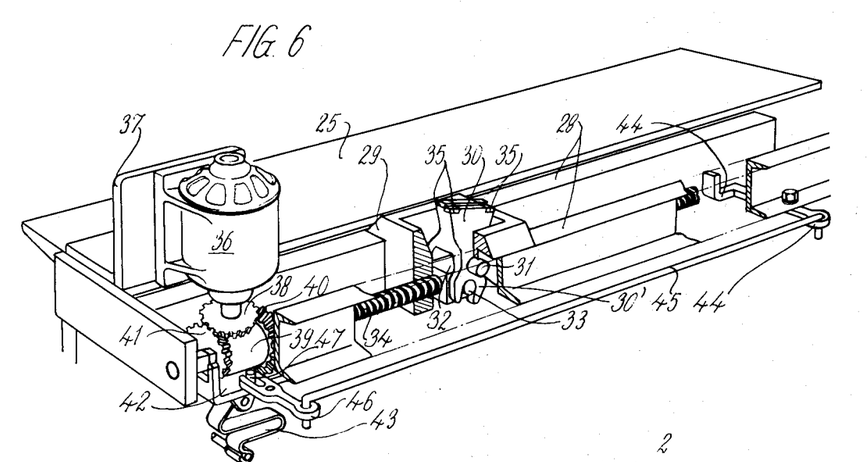
Fig. 6 is a perspective view of the planing device provided at the saw anvil, some parts being broken away and shown in section.

The planing device 27, the design of which appears more completely in Fig. 6, comprises two parallel races in the form of two U-beams 28 carried by the anvil 25. These U-beams are spaced from each other and support a slide 29, which is displaceable along the anvil 25 and projects downwardly into the space between the beams 28. The slide 29 is in the form of a vertically open, square sleeve, within which a tool 30 is swingably journalled on pins 31 fitted in the slide 29 and extending perpendicularly to the direction of movement of the slide. The lower part of the tool 30 is fork-shaped, and the fork shanks saddle a square nut 32, the side faces of which are provided with pin-like projections 33 coöperating with bifurcated ends 30' at the lowest shanks of the tool 30. Between the U-beams 28 is a screw 34, which passes freely through holes in the end walls of the slide 29 and is screwed into the nut 32 inside the slide. The internal distance between the end walls of the slide 29 exceeds the length of the nut 32 so that the nut is free to move a little forwards and rearwards in the slide 29. It is obvious that when performing such a movement the nut will swing the tool to and fro about the pins 31.

The top or head of the tool 30 is provided with hard metal tool bits 35 arranged stair-step-wise at either head end in the direction of movement, and the head is at such a height that the tool bit 35 located nearest the edge of the anvil 25 works exactly at a level with the anvil top, while the tool bit located more remote from the anvil edge works at a level which is slightly lower, for instance two hundredths of an inch. When the screw 34 rotates in one direction, it will pull the nut 32 against one end wall of the slide 29 before the nut can bring along the slide when moving along the screw 34, and in consequence the nut 32 will swing the tool 30 into such a position that the tool bits 35 which are located foremost in the direction of motion of the slide 29 will swing upwardly into operative position, whereas the two tool bits at the opposite end of the tool are swung down into inoperative position. This shifting of the tool is effected automatically when the screw 34 changes its direction of motion, and the slide 29 does not begin to move until the tool 30 has occupied the correct position. In normal operation, a protecting cap should of course be placed over the slide 29 to prevent stone powder from dropping on the screw 34 and into the cavity of the slide 29, where it might interfere with the functioning of the mechanism.

The screw 34 is rotated by an electric motor 36, which is secured to a bracket 37 at one end of the anvil and is in driving connection through a bevelled gear 38 with a sleeve 39 that embraces a square portion of the screw 34 and has at both ends thereof bevelled gear wheels 40 and 41 placed at such a distance from each other that only one gear wheel at a time can cooperate with the bevelled gear 38. The sleeve 39 is axially displaceable along the screw 34 and imparts its rotation to the screw 34, this motion being reversed when the sleeve 39 is axially displaced, so that the gear 38 is disengaged from one gear wheel 41 and engages the other gear wheel 40. The sleeve 39 cooperates with a reversing bridge 42, which is actuated by a booster spring 43, so that the sleeve 39 cannot take up any intermediate position and thus the gear 38 will always be in driving engagement with one or the other of the gear wheels 40 and 41.

In Fig. 6, where the gear 38 is shown engaging the gear wheel 41, the direction of rotation of the motor 36 and the thread of the screw 34 are in the direction to cause the slide 29 to be moved by the nut 32 towards the motor 36. After a while the slide 29 will then contact the reversing bridge 42, urging the latter to the left, as viewed in Fig. 6. The spring 43 will then effect a complete axial displacement of the sleeve 39 so that the gear wheel 40 engages the gear 38 and the screw 34 begins to rotate in reverse direction, the rotation of the nut 32 also being reversed so that the tool 30 is first swung over and the slide 29 together with the tool is then moved to the right. At the right end of the path of movement of the slide 29 a lever 44 is swingably journalled to the outermost one of the U-beams 28, and when this lever 44 is actuated by the slide 29 near the right end of the path of movement of the latter, the motion of the lever 44 is transmitted by a link rod 45 to another lever 46 provided at the left end of the anvil, so that, by the aid of a bifurcated end cooperating with a pin 47 on the reversing bridge 42, the lever 46 will move the sleeve 39 back to the initial position, the slide 29 being moved back towards the motor 36 after the tool 30 has changed its position. The lever 46 is also journalled to the outermost U-beam 28 in the same manner as the lever 44.

Due to the stair-step-like arrangement of the tool bits 35 on the tool 30 the stone block fed through the saw sash will be thoroughly planed on its lower side without the tool bits 35 being subjected to too heavy strains, and the slide 29 is arranged so as to perform a continuous reciprocating movement during the sawing operation at such a speed that it has time to accomplish at least a full stroke in each direction between successive intermittent advancements of the stone block across the anvil 25. The planing of the lower side of the stone block ensures an easy and jerkfree feeding of the block through the saw sash without any tilting to either side, which might jam the saw blades and damage their teeth. Of course it is only necessary to remove so much material by this planing that the stone block will rest stably against the top of the anvil 25, and thus smaller grooves and cavities may well be left as long as the peaks between them are cut down to a common level.

The stone blocks are transported into the sawing machine by means of suitable trucks 50 (Fig. 1) on which the blocks are supported by bearers so that the bottom of each block is at a level corresponding to the height of the anvil 25. The trucks 50 run on rails 51 (Fig. 2), and the front end of the stone block should protrude quite a distance beyond the truck in order that the front end of the stone block shall reach the anvil 25 when the truck 50 is in its innermost position. This is necessary because the stone block must be machined on the bottom side of its front end by the planing device 27 while still resting on the truck, so that the front portion of the bottom side of the block is planed when the cutting operation begins, and thus rests firmly on the anvil 25. Thereafter the weight of the stone block at the rear end is transmitted to a supporting beam 52 extending across the path of motion of the stone block and resting with its ends against two carriages 53, which are provided on either side of the path of the block, one on each side. Each carriage 53 is provided with two wheels 54 located one behind the other and running on rails 55 extending outside the rails 51 for the truck 50. Each carriage 53 is furthermore provided with a lateral extension 53' protruding outwardly and carrying a third wheel 56, which runs on rails 57 arranged outside the rails 55 and outside the guiding frame 3. The rails 57 extend longitudinally all through the machine. After the rear end of the stone block has been caused to rest on the beam 52, the bearers on the truck 50 are removed and the truck is then withdrawn under the beam 52 to be loaded with a new stone block.

As already mentioned, the outer rails 57 continue on the discharge side of the saw sash, where they carry a discharge truck 60 consisting of two side members, each of which is equipped with two wheels 61 mounted one behind the other, and which are rigidly interconnected at their ends remote from the saw sash by means of a cross beam 62. In other words, the discharge truck is substantially U-shaped when viewed from above (Fig. 2), and the side members are intended to carry loose beams 63 which may be placed substantially parallel to the cross beam 62. Besides, each side member supports braces 64, between which can be provided a beam 65 extending above the cut stone block, said beam 65 facilitating the fixing of the individual stone slabs on the discharge truck. When the sawing operation begins, the truck 60 is advanced until the fixed cross beam is in immediate proximity of the saw sash, whereby the front ends of the slabs into which the stone block has been cut during its passage through the saw sash will come to rest on the cross beam 62, whereafter the truck 60 is caused to partake in the feed motion of the stone block. This is achieved by securing the front ends of the stone slabs to the cross beam 62 in some suitable way, and one or more of the loose beams 63 are then pushed in below the cut slabs as the truck moves away from the saw sash, the slabs thus being supported all along their length. When the truck has advanced so far that the top beam 65 can be secured between the braces 64, the stone slabs may also be fixed at their other edges. After the sawing operation has been accomplished, the discharge truck 60 serves to transport the cut stone block to a suitable unloading place. The use of the carriage 53 and truck 60 greatly improves the whole procedure, as the stone block is transferred to new transport means simultaneously with being cut. This also saves much time when changing the stone block, and thus the idle time of the sawing machine is reduced to a minimum.

The feeding of the stone block through the saw sash during sawing as well as during the preparatory planing of the bottom of a new stone block is effected by means of a feeding mechanism working in response to the movements of the saw sash during the sawing operation, so that feeding of the stone block takes place in the intervals when the saw blades return to the initial position after having accomplished a cutting stroke. The feeding mechanism comprises two longitudinal U-beams 66 with opposed flanges, provided one on either side of the saw sash and stably carried by the side supports 1 of the machine as well as by special columns 67 and 68 placed behind and before the side supports 1 respectively calculated in the feeding direction. The lower flanges of the U-beams serve as races for a kind of carriages, one of which is placed on the inlet side of the saw sash and one on the discharge side thereof. Each carriage consists of two side plates 69, one adjacent each U-beam 66, and at each side plate is journalled a larger wheel 70 running against the upper side of the lower flange of the U-beam—see particularly Figs. 7 and 8—and smaller, lower wheels 71 being longitudinally displaced in either direction relative to the upper, larger wheel one against the underside of the lower flange.

Figure 7:
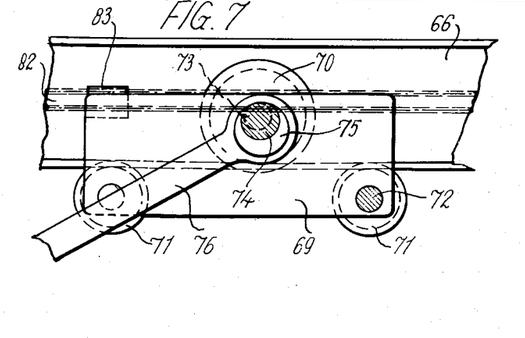
Figure 8:
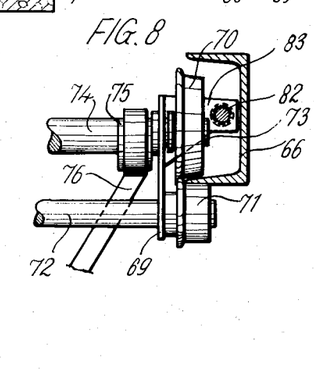

The foremost, smaller wheel 71 is journalled on a short pin projecting from the plate 69, while the rear wheel 71 is journalled on a shaft 72 extending across the saw between the two side plates 69. The larger, upper wheels 70 are journalled on eccentric end pivots 73 protruding from a heavy transversal shaft 74, which is rotatably mounted in the side plates 69, and extends between these. On the inner side of the side plates 69 the shaft 74 carries fixed eccentrics 75, the centre of which is displaced oppositely to the centre of the pivots 73 relative the centre of the shaft 74. Arms 76 are swingably journalled on the eccentrics 75 so as to extend downwardly-inwardly therefrom. The arms 76 from the eccentrics 75 provided adjacent the respective side plates 69 are interconnected by means of cross members 77 so as to form a frame, and carry mechanical screw jacks 78, two of which are placed on the carriage on the inlet side of the saw sash and one only is placed on the carriage on the discharge side thereof. Preferably the two jacks provided on the inlet side carriage are laterally displaceable. At the lower ends of the jacks are clamping members 79, which are made of sheet metal and are connected in pairs at such a distance from each other that they can enter between the saw blades 18 in the saw sash if required. With the jacks 78 the clamping members 79 can be pressed against the upper end edges of the stone block to be cut up, the jacks on the carriage located at the inlet side of the saw sash being directed obliquely forwardly/downwardly towards the rear block end, and the jack on the discharge side of the saw sash pointing obliquely rearwardly/downwardly as shown.

When pressing the clamping members 79 against the stone block a clamping of the carriage wheels against the lower flange of the U-beams 65 and 66 is effected by co-operation between the eccentrics 75 and the eccentric shaft pivots 73, the wheels 70, the carriages in consequence running firmly along the U-beams.

Figure 9:
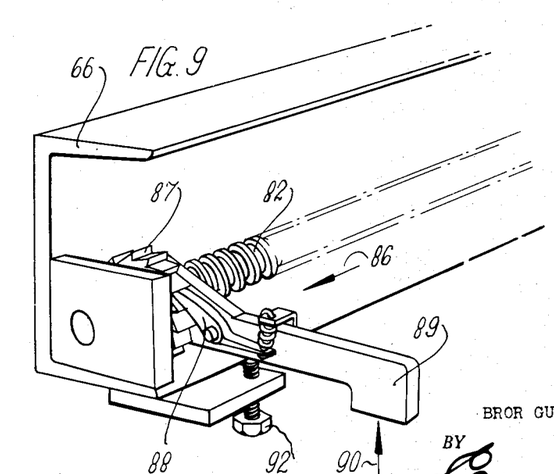

On the inlet side of the saw sash a screw 82 is fitted in each of the two U-beams 66, and this screw is in engagement with a threaded hole in a slide 80, which is reciprocatably mounted and guided in the U-beam 66 adjacent the rear feeding carriage, and which by means of a rod 80', is rigidly but adjustably connected to the corresponding side plate 69 of the carriage located at the discharge side of the saw sash in that the rod 80' passes through a bore in the last-mentioned plate where it is clamped by a bolt 81 so that the distance between the slide 80 and the clamping carriage may be adjusted by loosening the bolt 81. The screw also passes a hole in and engages the internal thread of a projection 83 provided on each side plate 69 of the rear feeding carriage. By means of the jacks 78 the two carriages will be pressed apart during operation and so will the projection 83 of the rear carriage and the slide 80, so that all play in the threads of the screws 82 will be eliminated and the stone block will be fed firmly over the anvil. The two screws 82 are interconnected by means of bevelled gears and a cross shaft 84 extending across the saw between the rear columns 67. Adjacent one column 67 is an electric motor 85, by the aid of which the screws 82 may be caused to rotate quickly in desired direction when so required, whereby the rear feeding carriage can be moved quickly into suitable position. During the cutting procedure proper, however, the screws 82 are driven by a step feeding device, which is generally designated by the numeral 86 and comprises, as is particularly apparent from Fig. 9, a toothed wheel 87 which is fixed on the screw 82 and is actuated by a spring-loaded ratchet 88 provided on an arm 89 that is journalled so as to swing freely about the screw 82. By a shoulder bracket 91 projecting rearwardly from the upper end of the slide 10 (see Fig. 1) the outer end of the arm 89 is urged in the direction of the arrow 90 each time the slide 10 with the saw sash 14 moves upwards. Since the upper limit of the reciprocation of the slide 10 is predetermined, the step feeding device will turn the screw 82 during the upwards movement of the slide 10, and the extent of the turning movement can be adjusted by means of a set screw 92, with the aid of which the arm 89 can be kept in such a position that it is actuated sooner or later by the bracket 91 and is thus caused to swing through a larger or smaller angle between its lower position, which is determined by the set screw 92, and its upper position, which is determined by the upper limit of the reciprocation of the slide 10. The step feeding devices 86 at the respective U-beams 66 are mirror pictures of each other, and the screws 82 at the respective beams consequently will turn in opposite directions and synchronously due to the cross shaft 84.

It is obvious that by means of this feeding device the stone block to be cut can be fed through the saw sash during the intervals when the saw blades 18 do not cut the stone. The stone block is pressed against the anvil by the jacks 78 and thus it is always stable, and the clamping device provided at the discharge side of the saw sash and pressing the stone block rearwards effectively prevents the stone block from unintentionally sliding in the lateral direction as well as from being advanced more than desired, which might otherwise occur in the event that the saw teeth have become fastened in the stone. The feeding device does not prevent access to the anvil and the saw sash, and in case the saw sash fails to work for some reason or other, the feeding of the block will stop also, damaging of the machine thus being avoided.

The pressure liquid which is required for driving the slide hydraulically by means of the jack 11 is delivered from a pump 100 mounted on a bracket behind the cross beam 2 and the liquid used is contained in a reservoir 101 placed on the same bracket.

As would be obvious from the foregoing, the teeth 18' of the saw blades 18 should cut only during the downwards stroke of the saw sash and the slide 10, whereas they must not engage the stone block during the upwards stroke of the slide 10 back to the initial position, as in such a case the teeth 18' might easily break down. This movement of the saw blades is effected through co-operation between the hydraulic jack 11, which moves the slide 10 with the saw sash 14 upwards and downwards along the guide frame 3, and the hydraulic pressing jack 5. The latter jack serves to effect a pull at the lower portion of the guiding frame 3 at the end of the downwards movement of the saw sash in order to swing the guide frame slightly clockwise in Fig. 1, whereby the teeth 18' of the saw blades 18 are disengaged from the stone block. While the jack 5 is holding the guiding frame in swung-out position, the saw sash with the saw blades are restored upwards into the initial position by the jack 11. When the jack 11 begins to press the slide 10 with the saw sash 14 downwards again, the jack 5 is arranged to press the guide frame against the shoulder 7 anew, so that the teeth 18' of the saw blades 18 are caused to gently engage the stone block, which has been advanced a small distance during the upwards movement of the saw sash. In order to disengage the saw teeth from the stone block under all circumstances when the saw sash approaches its lowest position, the lower portion of the slide 10 is arranged so as to actuate two levers 95, which are swingable about a horizontal shaft 96 in the well 4 and engage the lower portion of the guiding frame 3 with two hook-like link arms 97 in such a way that the guiding frame 3 is automatically swung away from the shoulder 7 by the last portion of the downward movement of the slide 10. This latter means also serves to overcome the inertia of the jack 5 when this is to reverse its motion.

Figure 10:
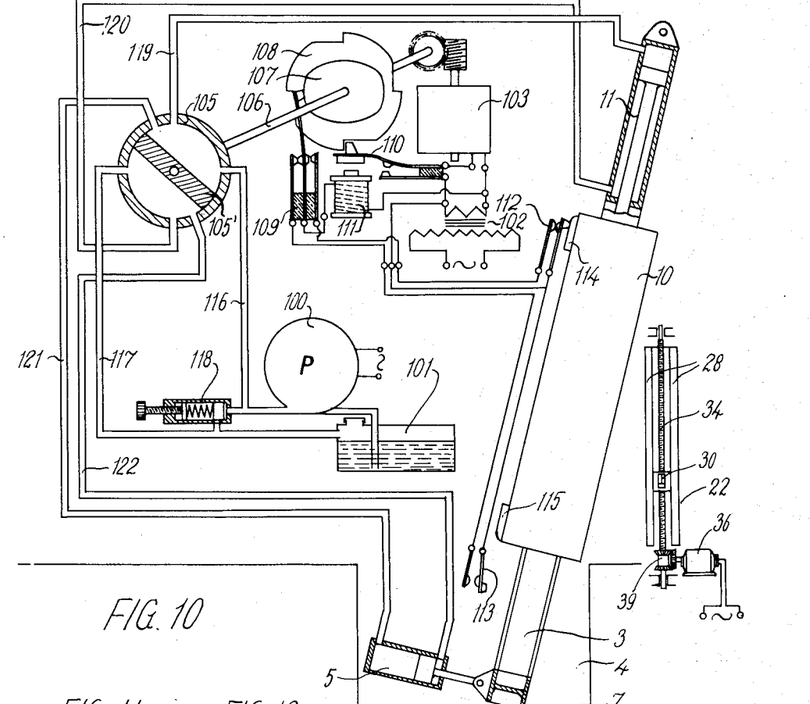

To effect the desired operation of the sawing machine several known control means may be used. In Figure 10 there is diagrammatically shown one embodiment of such means in suitable combination. The pump 100 for supplying the liquid under pressure to the hydraulic operating jacks 11 and 5 respectively is electrically driven and so is the planing device 27 as previously described. Electrical current, suitably transformed to a low voltage by a transformer 102, is also used for driving a small servo-motor 103, which, through a worm gear 104, actuates a fluid directing valve 105 comprising a cylindrical housing and a rotatable valve flap 105'. The valve and the servo-motor are arranged to turn intermittently in dependence on the movements of the slide 10 enclosing the saw sash. Therefore, on the shaft 106 of the valve flap there are mounted two cam discs 107 and 108, the cam 107 being of oval shape cooperating with a double-acting spring contact device 109, and the cam 108 having four uniformly spaced teeth or cam surfaces cooperating with a spring contact arm 110 of a relay including an electromagnet 111 capable of actuating the spring contact arm 110 by pulling an armature thereon.

The spring contact arm 110 is arranged to close the electrical circuit to the servo-motor 103 when actuated, while the contact device 109 forms part of an energizing circuit for the electromagnet 111 and serves as a change-over switch for alternatively including one of two switches 112 and 113 respectively in said magnet energizing circuit. These switches 112 and 113 are mounted on the guide frame 3 by means of suitable adjustable brackets (not shown) near the respective ends of the stroke of the slide 10, and the switches are actuated by cam means 114 and 115 respectively on the slide 10 to close the magnet energizing circuit at the ends of the stroke of the slide and, consequently, of the saw sash and blades.

The valve 105 is connected to the pump 100 by a supply conduit 116 and to the reservoir tank 101 by a return conduit 117. The pump receives the liquid from the tank 101 and between the supply conduit 116 and the return conduit 117 there is provided a spring actuated, adjustable overflow valve 118 keeping the fluid pressure in the supply conduit 116 below a predetermined maximum so that the operation of the sawing machine will cease before the teeth of the saw blades break down if there should occur any unexpected resistance in the stone block to be sawn. The valve 105 is also connected to the respective ends of the double acting, slide actuating jack 11 by means of conduits 119 and 120, and to the respective ends of the double acting pressing jack 5 by means of conduits 121 and 122.

The supply conduit 116 and the return conduit 117 as well as the two conduits 119 and 120 to the slide actuating jack 11 and the two conduits 121 and 122 to the pressing jack 5 open into the valve housing in mutually diametrically opposed positions, as shown, and the valve flap 105′ is of such a thickness that it is capable of momentarily closing both openings in each pair when passing them during its intermittent rotation. The outlet openings of the valve housing 105 communicating with the conduits 119 and 120 to the jack 11 are displaced 90° relatively to the supply and return openings for the fluid communicating with the conduits 116 and 117 respectively, while the openings communicating with the pair of conduits 121 and 122 leading to the pressing jack 5 are located only a small angle in front of the openings communicating with the conduits 119 and 120, considered in the direction of rotation of the flap 105′, as shown.

Figures 11, 12:
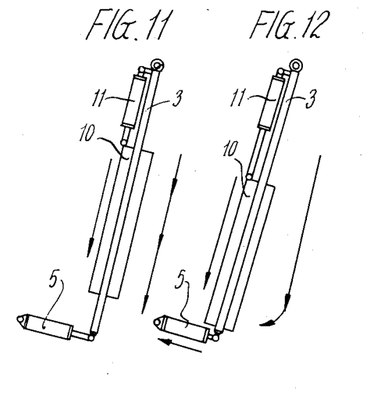

The control system acts as follows: Assuming that the slide 10 in Fig. 10 is on its way downwardly from its upper position as indicated in Fig. 11—the upper cam means 114 on the slide 10 having recently closed the switch 112 and caused the servo-motor 103 to turn the valve flap 105′ a quater of a revolution so that the circuit containing switch 112 has been interrupted by the changeover switch 109 as shown—then fluid under pressure is supplied from the pump 100 to the upper end of the slide actuating jack 11 causing the slide 10 to move downwardly and also to the outer end of the jack 5 causing the guide frame 3 and the slide 10 to press the saw blades against the stone block during sawing. When the slide 10 approaches its lowermost position, the cam means 115 closes the switch 113 which is now in series with the electromagnet 111 due to the position of the change-over switch 109 actuated by the cam disc 107, so that the spring contact arm 110 is actuated and the circuit to the servo-motor 103 is closed. The servo-motor 103 then turns the valve flap 105′ in a clockwise direction a quarter of a revolution so that the flap first closes the openings to the jack 5 and then, while reversing the fluid flow to this jack, halts the fluid flow to the slide actuating jack 11 and finally reverses the flow to the jack 11, the slide 10 being then first withdrawn from the stone block as indicated in Fig. 12 and thereafter its direction of movement will be reversed.

Figure 13:
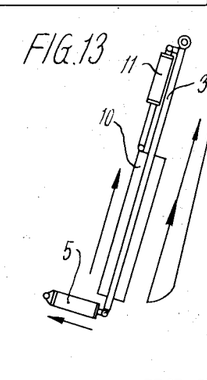

Since the cam discs 107 and 108 turn with the valve flap 105′, the oval disc 107 will very soon let the spring contact device 109 break the closed circuit through the closed switch 113 but at the same time the spring contact arm 110 will be actuated by the cam disc 108 to keep the circuit to the servo-motor 103 closed until the valve flap 105′ has been turned a full quarter of a revolution, after which the spring contact arm 110 is again released and thus the circuit to the servo-motor broken. Now the valve flap 105′ is in a resting position at right angles to the position shown in Fig. 10 and the slide 10 will move upwardly as shown in Fig. 13 while the jack 5 still keeps the slide withdrawn from the stone block to be sawn. During the later part of this movement of the slide 10, the stone block will be fed forwardly towards the saw blades a small distance by the feeding mechanism previously described.

Figure 14:
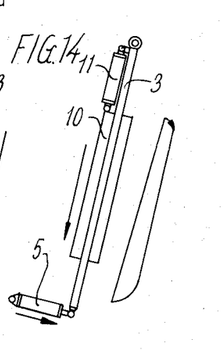

As soon as the slide 10 approaches its uppermost position the switch 112, the circuit of which is otherwise closed due to the changed position of the spring contact device 109, will be actuated and closed by the cam means 114 on the slide 10, the electromagnet 111 will be energized and the servo-motor 103 started to turn the valve flap shaft 106 another quarter of a revolution so that first the flap 105′ will close the supply conduit 116 and the return conduit 117 and then reverse the fluid flow to both jacks 5 and 11 respectively thereby causing the slide 10 and the saw blades therein to move towards the stone block and simultaneously downwards to start cutting again as indicated in Fig. 14. At the same time the spring contact device 109 has been actuated by the cam disc 107 to change-over the magnet energizing circuit to switch 113 again, while the cam disc 108 has secured rotation of the shaft 106 a full quarter of a revolution as before.

By rotating the valve flap 105′ with a reasonably low speed—which of course calls for certain lengths of the cam means 114 and 115 so that the operation of the saw will not stop during the change of direction of movement of the slide 10—the movements of the slide will be smooth and since the direction of movement of the slide cannot be changed before the slide approaches the respective ends of its stroke, the slide will stop if the pressure (set by the valve 118) of the liquid supplied by the pump 100 is insufficient to force the saw blades through the stone block signalling need for particular care.

Of course the invention is not limited to the particular form herein shown and described. It will be readily understood by those skilled in the art that the shape, size and arrangement of the various parts of the machine may be varied within wide limits without departing from the scope of the appended claims. Thus, it will be possible for example to use any known driving mechanism, such as a hydraulic one, for reciprocating the tool of the planing device, or it will be possible to use other known means for planing the bottom of the stone block during its passage through the machine such as a row of rotating milling cutters. There may also be changes made in the feeding and block clamping mechanism and in the hydraulic control means. Of course the general principle for sawing stone blocks while feeding them horizontally over an anvil through a vertical saw sash may also be employed without using a hydraulically driven saw sash.

I claim:

1. In a stone sawing machine for sawing stone blocks having plane bottom surfaces the combination of a supporting structure, a substantially vertical saw sash having a plurality of parallel saw blades stretched between the upper and lower sides thereof, means for imparting to said saw sash a generally vertical reciprocating motion, a stationary, rigid anvil structure in front of said saw sash for slidably supporting the stone block to be cut up into slabs by said saw blades, said anvil structure having a horizontal, plane top surface over which the plane bottom surfaces of the successive stone blocks slide, means for feeding said stone block substantially horizontally through said saw sash, said feeding means including advancing pushing means acting on the rear end of said block for advancing said block over said anvil structure while in sliding contact with the top surface thereof, and advancement resisting means behind said saw sash for pressing said block rearwardly into firm contact with said pushing means for preventing unintentional movements of said stone block to be sawn.

2. In a stone sawing machine the combination as claimed in claim 1, wherein said anvil structure is provided with extensions entering the spaces between the saw blades in said saw sash.

3. In a stone sawing machine the combination as claimed in claim 1, wherein means are provided for receiving the cut stone slabs said means including movable supports advanced by the feeding movement imparted to said stone block.

4. In a stone sawing machine the combination as claimed in claim 1, whereing means are provided for receiving the cut stone slabs, said means comprising a carriage having a frame which is U-shaped in plan view, said carriage being movable into a position wherein its frame shanks embrace said saw sash.

5. In a stone sawing machine the combination as claimed in claim 1, wherein means are provided for planing the bottom surface of said stone block, said means including cutting tools operating in front of said anvil structure for removing enough material from said stone block to avoid any tilting tendency of said block on said anvil structure.

6. In a stone sawing machine the combination as claimed in claim 1, wherein said feeding means are arranged to operate intermittently and responsive to the reciprocating motion of said saw sash and wherein said saw blades are adapted to cut in one direction of movement only, the further provision of means for pressing said saw blades towards said stone block during each operative stroke of said saw sash and for withdrawing said saw blades from engagement with said stone block during each inoperative return stroke of said sash.

7. In a stone sawing machine the combination of a supporting structure, a substantially vertical saw sash having a plurality of parallel saw blades stretched between the upper and lower sides thereof, guiding means for said saw sash in said supporting structure permitting substantially vertical reciprocation of said saw sash, means for supporting the stone block to be cut up into slabs by said saw blades, means for feeding said stone block substantially horizontally through said saw sash and means for imparting to said saw sash a reciprocating movement along said guiding means in the longitudinal direction of said saw blades, said last mentioned means including a double-acting hydraulic jack device arranged substantially vertically between said saw sash and said supporting structure, a source of fluid under pressure connected to said jack device, and valve means alternatively admitting the fluid under pressure to the respective inlets of said jack device to actuate same in opposite directions, said valve means being controlled by the reciprocating movement of said saw sash.

8. In a stone sawing machine the combination as claimed in claim 7, wherein said means for supporting the stone block includes a stationary anvil structure arranged closely adjacent and in front of said saw blades and having a flat top surface, and wherein said means for feeding said stone block includes pushing means advancing said stone block in sliding contact with said flat top surface of said anvil structure.

9. In a stone sawing machine the combination as claimed in claim 7, wherein said guiding means includes a substantially vertical guide frame embracing said saw sash and having its top portion hingedly connected to said supporting structure so as to be swingable about a horizontal axis perpendicular to the planes of said saw blades, shoulder means cooperating with the lower portion of said guiding frame for defining one position thereof, and of means for swinging said guide frame alternatively against and away from said abutment means at the end of each stroke of said saw sash.

10. In a stone sawing machine the combination as claimed in claim 7, wherein said guiding means includes a frame-like slide in which said saw sash is exchangeably mounted.

11. In a stone sawing machine the combination as claimed in claim 7, wherein said means for imparting a reciprocating movement to said saw sash further includes pressure sensitive means in communication with said hydraulic jack device and capable of restricting the fluid flow to said jack device as soon as the fluid pressure therein exceeds a predetermined value.

12. In a stone sawing machine the combination of a supporting structure, a substantially vertical saw sash having a plurality of parallel saw blades stretched between the upper and lower sides thereof, guiding means for said saw sash in said supporting structure permitting substantially vertical reciprocation of said saw sash, means for supporting the stone block to be cut, said means including a stationary anvil structure immediately in front of said saw sash, means for planing the bottom side of said stone block in front of said anvil structure; means for feeding said stone block substantially horizontally through said saw sash, said means including pushing means acting on said block for advancing same while keeping it in sliding contact with said anvil structure, means for taking care of the cut stone slabs behind said saw sash, said means including movable supports advanced by the feeding movement imparted to said stone block, and means for imparting to said saw sash a reciprocating movement along said guiding means substantially in the longitudinal direction of said saw blades, said last mentioned means including at least one double-acting hydraulic jack arranged substantially vertically between said saw sash and said supporting structure, a source of substantially incompressible fluid under pressure connected to said jack and valve means alternatively admitting the fluid under pressure to the respective inlets of said jack to actuate same in opposite directions, said valve means being controlled by the reciprocating movement of said saw sash.

13. In a stone sawing machine the combinations as claimed in claim 12, wherein said means for feeding said stone block include mechanical jack means for pressing said stone block downwardly against the top surface of said anvil and for clamping said stone block in its longitudinal direction and means for intermittently advancing said jack means and said block in the longitudinal direction of the machine.

14. In a stone sawing machine the combination as claimed in claim 12, wherein said means for feeding said stone block include races parallel to the top surface of said anvil structure and extending longitudinally of the machine at a level above said stone block to be sawn, two carriages, one at each side of said saw sash, running along said races, mechanical jack means on each of said carriages mounted to incline downwardly towards said stone block, clamping means on said jack means contacting opposite upper end edge portions of said stone block and capable to enter between the saw blades in said saw sash, and means for intermittently advancing both said carriages responsive to the operation of said saw sash while maintaining the relative positions of said carriages.

15. In a stone sawing machine according to claim 14 wherein said means for intermittently advancing both said carriages include screws cooperating with threaded portions of each carriage and ratchet means actuated by said reciprocatable saw sash for intermittently turning said screws.

16. In a stone sawing machine the combination as claimed in claim 12, wherein said guiding means includes a substantially vertical guide frame embracing said saw sash and having its top portion hingedly connected to said supporting structure so as to be swingable about a horizontal axis perpendicular to the planes of said saw blades, stop means cooperating with said guiding frame to define one position thereof in which said saw blades are in engagement with said stone block, under operative conditions, hydraulic jack means for keeping said guide frame in contact with said stop means during one stroke of said saw sash, means for swinging said guide frame away from contact with said stop means during next stroke of said saw sash to keep said saw blades out of contact with said stone block during said latter stroke, and means for admitting fluid under pressure to said jack means, said last-mentioned means being controlled by the reciprocating movement of said saw sash.

17. In a stone sawing machine the combination as claimed in claim 12, wherein said means for planing the bottom side of said stone block includes transversely reciprocating cutting tools adjacent said anvil structure.

18. In a stone sawing machine the combination of a supporting structure, a substantially vertical saw sash having a plurality of parallel saw blades stretched between the upper and lower sides thereof, guiding means for said saw sash in said supporting structure permitting substantially vertical reciprocation of said saw sash, means for supporting the stone block to be cut up into slabs by said saw blades, means for feeding said stone block substantially horizontally through said saw sash and means for imparting the said saw sash a reciprocating movement along said guiding means in the longitudinal direction of said saw blades, said last-mentioned means including a hydraulic jack means arranged substantially vertically between said saw sash and said supporting structure and operable in opposite directions, a source of fluid under pressure connected to said jack means, and valve means controlled by the reciprocating movement of said saw sash and alternatively admitting the fluid under pressure to said jack means to actuate the latter in said opposite directions.

19. In a stone sawing machine the combination of a supporting structure, a substantially vertical saw sash having a plurality of parallel saw blades stretched between the upper and lower sides thereof, guiding means for said saw sash in said supporting structure permitting substantially vertical reciprocation of said saw sash, means for supporting the stone block to be cut, said means including a stationary anvil structure immediately in front of said saw sash, means for planing the bottom side of said stone block in front of said anvil structure, means for feeding said stone block substantially horizontally through said saw sash, said means including pushing means acting on said block for advancing same while keeping it in sliding contact with said anvil structure, means for taking care of the cut stone slabs behind said saw sash, said means including movable supports advanced by the feeding movement imparted to said stone block, and means for imparting to said saw sash a reciprocating movement along said guiding means substantially in the longitudinal direction of said saw blades, said last-mentioned means including hydraulic jack means arranged substantially vertically between said saw sash and said supporting structure and operable in opposite directions, a source of fluid under pressure connected to said jack means, and valve means controlled by the reciprocating movement of said saw sash and alternatively admitting the fluid under pressure to said jack means to actuate the latter in said opposite directions.

References Cited in the file of this patent

UNITED STATES PATENTS

| | | |
|---|---|---|
| 200,593 | Young | Feb. 19, 1878 |
| 315,608 | Frenier | Apr. 14, 1885 |
| 337,661 | Campbell | Mar. 9, 1886 |
| 578,116 | Peckover | Mar. 2, 1897 |
| 675,904 | Perkins | June 11, 1901 |
| 958,684 | Witt | May 17, 1910 |
| 1,095,708 | Chase | May 5, 1914 |
| 1,097,747 | Bickford | May 26, 1914 |